United States Patent [19]
Broghammer

[11] Patent Number: 6,041,511
[45] Date of Patent: Mar. 28, 2000

[54] COORDINATE MEASURING EQUIPMENT

[75] Inventor: Heinz Broghammer, Zimmern, Germany

[73] Assignee: Carl-Zeiss-Stiftung, Germany

[21] Appl. No.: 08/980,144

[22] Filed: Nov. 26, 1997

[30] Foreign Application Priority Data

Nov. 28, 1996 [DE] Germany .......................... 196 49 252

[51] Int. Cl.[7] ................................................. G01B 7/02
[52] U.S. Cl. ............................................. 33/503; 33/556
[58] Field of Search ................... 33/503, 1 AA, 33/1 M, 556, 557, 559

[56] References Cited

U.S. PATENT DOCUMENTS

| | | | |
|---|---|---|---|
| 3,774,311 | 11/1973 | Stemple | 33/503 |
| 4,766,674 | 8/1988 | Zanier et al. | 33/503 |
| 5,072,522 | 12/1991 | Stott et al. | 33/503 |
| 5,621,978 | 4/1997 | Sarauer | 33/1 M |
| 5,867,916 | 2/1999 | Matzkovits | 33/503 |

*Primary Examiner*—Andrew H. Hirshfeld

[57] ABSTRACT

A coordinate measuring equipment has at least one part that is movably guided on a guideway for measuring a workpiece and a drive for moving the part along the guideway. The drive for moving the part is connected to the guideway by means of a frictional connection.

6 Claims, 3 Drawing Sheets

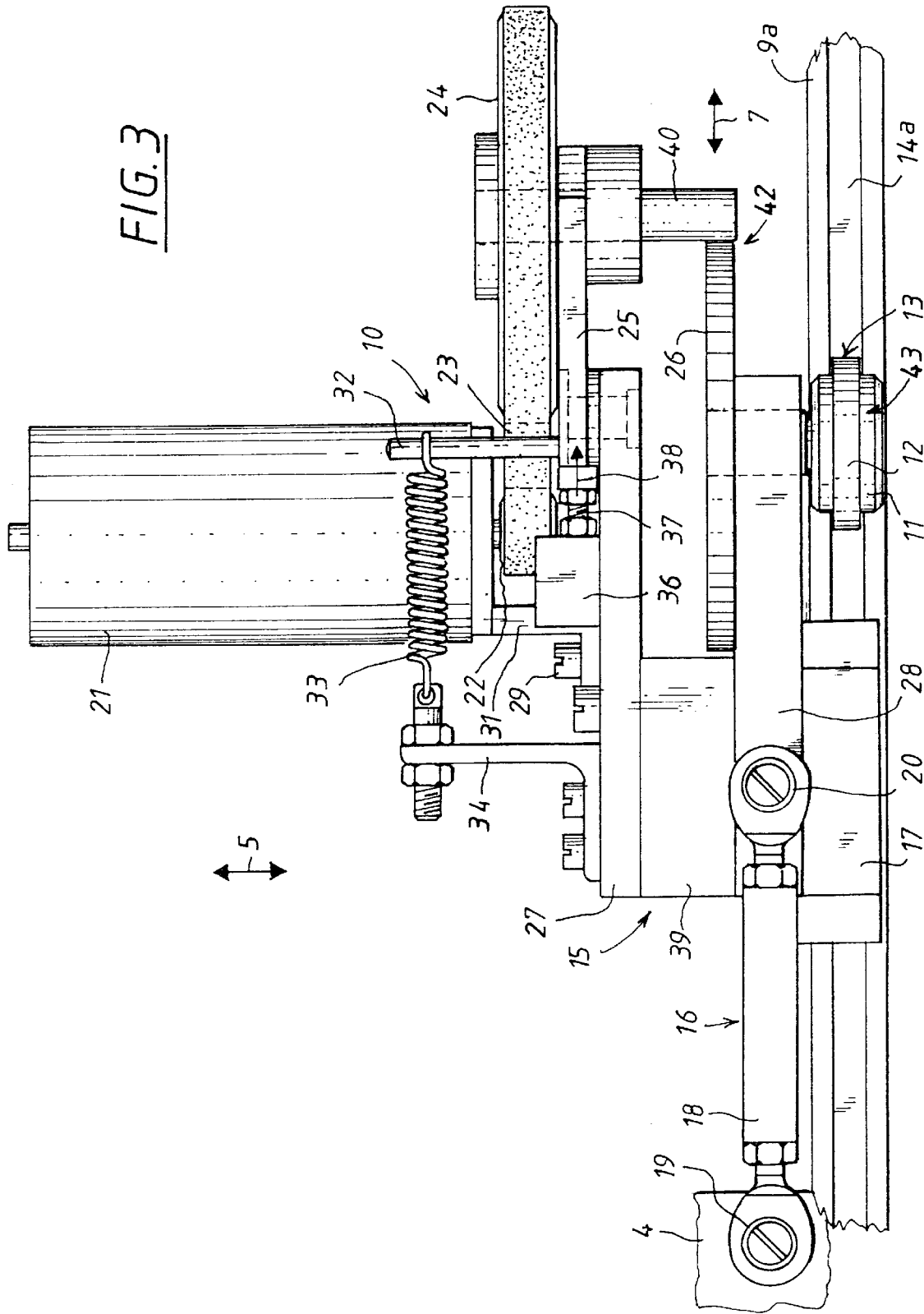

COORDINATE MEASURING EQUIPMENT

BACKGROUND OF THE INVENTION

1. Field of the Invention

This invention relates to a coordinate measuring equipment, and more particularly to coordinate measuring equipment with at least one part that is movably guided on a guideway for the measurement of a workpiece and has a drive for moving the part along the guideway.

2. Discussion of Relevant Prior Art

Such coordinate measuring equipment has been known in great variety for a long time. They are used for the three-dimensional measurement of workpieces which are to be measured, the workpiece being sensed for this purpose either mechanically or optically by a corresponding sensor. For sensing the workpiece to be measured, the sensor is then suspended on a mechanism by which it can be moved in three mutually orthogonal measuring directions. In terms of the mechanism, there are at present two current embodiments, namely, on the one hand, the so-called stand construction, and on the other hand, the so-called portal construction.

In the stand construction, the sensor is located on a horizontal extension arm. The extension arm is movably guided on a vertical stand by means of a slide, such that it can be moved both horizontally along its longitudinal axis, and also vertically along the stand. The stand is likewise, for its part, movably guided on a machine bed, and can be moved horizontally in the third measurement direction.

The structure is similar in portal measuring equipment. The sensor is here attached to a vertically aligned sleeve. The sleeve is movably guided by means of a slide on the part of the spanning portal which spans the workpiece to be measured. The sleeve can be moved by means of the slide, both vertically along its own longitudinal axis and also horizontally along the spanning portion of the portal. The portal, for its part, is likewise movably guided on a machine bed, and can be moved horizontally in the third measurement direction.

The movably guided parts, such as for example the stand, the portal, the slide, the extension arm, the sleeve, etc., are movably guided on a guideway, the corresponding movable parts being driven for movement along the guideway.

Various possibilities have long been known for the drives.

Thus it has been proposed, for example, to drive the movably guided parts by means of feed shafts operated by electric motors. Usually, a feed shaft which is stationary relative to the guideway, is parallel to the guideway, and has a thread, is rotated by an electric motor. A nut attached to the movably guided part engages with the thread of the feed shaft, and is moved along the guideway by the rotation of the feed shaft.

It has likewise been proposed to drive movably guided parts of coordinate measuring equipment by means of tie belts operated by electric motors. Here, an electric motor, which is stationary relative to the guideway, usually drives a tie belt which is firmly attached to the movably guided part, so that the movably guided part is thereby driven.

Friction wheel drives, also driven by electric motors, have also become widespread in driving coordinate measuring equipment; in them, rubber-covered friction wheels frictionally cooperate with a running surface, which is specially provided for this purpose, and thereby drive the movably guided parts. Since the movable parts are usually mounted on the guideways on highly sensitive air bearings, and the running surface is decoupled from the guideway in this case.

SUMMARY OF THE INVENTION

Accordingly, the object of the present invention is to provide a coordinate measuring equipment which is cost-effective to produce and which has a simple drive.

The object is attained by coordinate measuring equipment with at least one part that is movably guided on a guideway for measurement of a workpiece and with a drive for moving the part along the guideway. The drive is connected to the guideway by means of a frictional connection.

An important concept of the invention is that the drive for moving the movable part is connected to the guideway by means of a frictional connection.

The guideway thus serves both for guiding the movably guided part and also for driving the movably guided part. The particular advantages resulting thereby are that on the one hand the total space requirement for the drive and for guiding the movably guided part can be considerably reduced, and on the other hand, the construction of the drive is simplified.

In an advantageous embodiment of the coordinate measuring equipment, the drive can be located on a separate slide which is movably mounted on the guideway, and which is connected, movable transversely of the guideway, to the movably guided part by means of a connector. Such an embodiment of the coordinate measuring equipment has considerable advantages over conventional coordinate measuring equipment. Thus transverse forces which arise from the drive are no longer transmitted to the movably guided part, which leads to a considerable increase in measurement accuracy. Furthermore, the connection between the slide and the movably guided part can be constructed such that the drive is thermally decoupled from the movably guided part, so that measurement inaccuracies which result from the heating of the drive can be prevented as far as possible.

So that the slide is movably connected transversely of the movably guided part, the connector provided for this purpose should have at least two joints. The specific embodiment of the connector can be such that the connector has a rod which is connected at its one end to the slide by means of one of the joints, and at its other end to the movable part by means of the other joint. The joints can be either in the form of rotary joints, so that the slide is then movable transversely of the guideway in the direction of rotation of the rotary joint; or the joints can be in the form of ball joints, so that the slide is movable relative to the movable part in each direction transverse to the guideway.

Many different variants are conceivable as the frictional connection. The frictional connection can include, for example, a friction wheel which is in contact with the guideway. The frictional connection can of course also include a belt, which runs around two rotatable rollers, so that the outer side of the belt is likewise in contact with the guideway.

The frictional connection is preferably driven by an electric motor which is connected to the frictional connection by means of a coupling. The connection of the rotor to the frictional connection by means of a coupling can be for the purpose of uncoupling the motor when required, so that the movable part can then be moved by hand.

Many different guideways can be considered as possible guideways. Thus the usual guideways of stone can of course be used, with the movable part mounted on them by means of air bearings. As already mentioned above, such guideways are however relatively sensitive, so that the guideway should more preferably be embodied as a metal guideway, on which the movable part can then be guided by means of so-called ball shoes, described in more detail hereinbelow, or else by means of rollers.

BRIEF DESCRIPTION OF THE DRAWINGS

Specific embodiments of the invention will now be described, taken together with the drawings, in which:

FIG. 3 shows the drive unit according to FIG. 2, in side view.

DETAILED DESCRIPTION OF PREFERRED EMBODIMENTS

Figure 1:
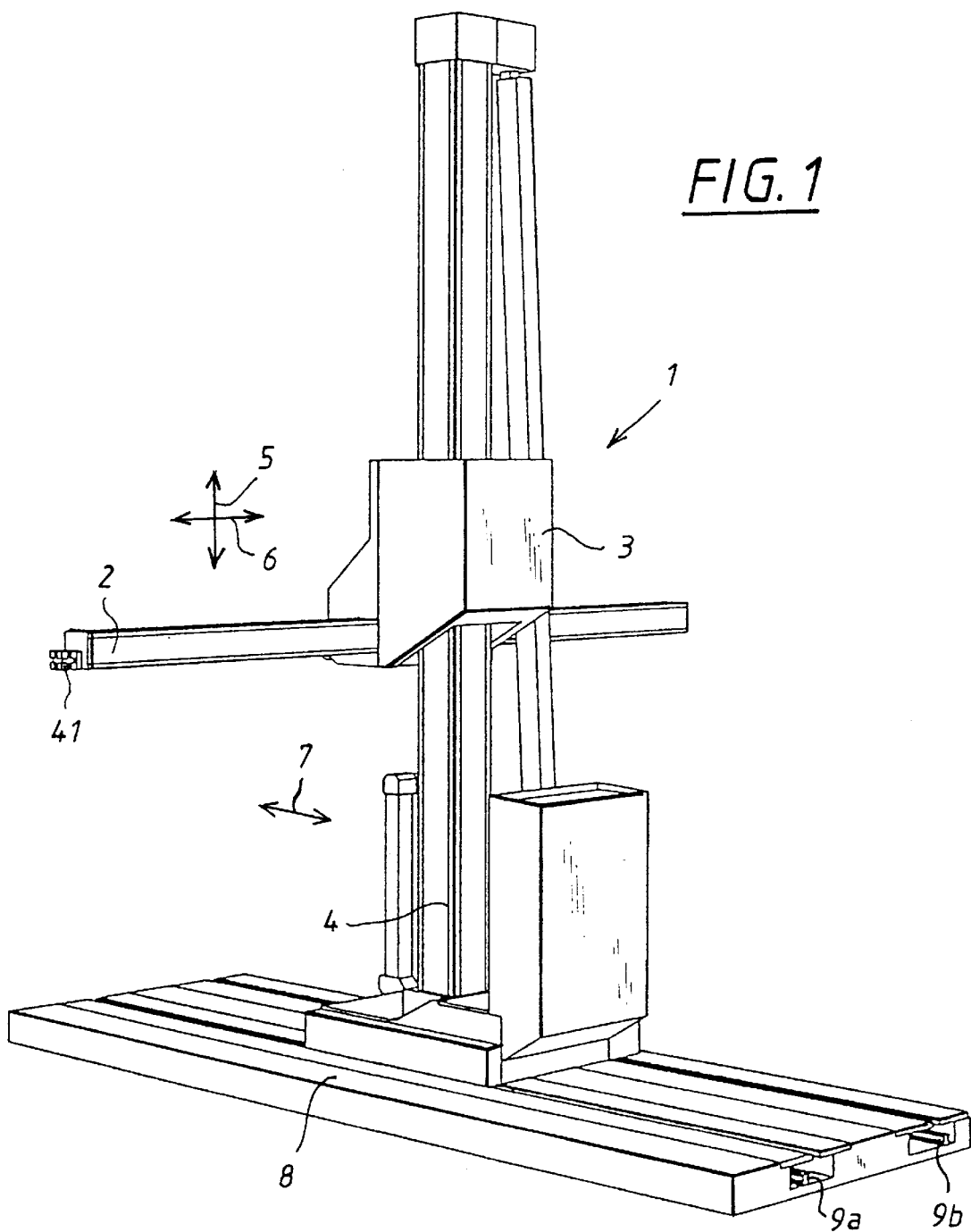
FIG. 1 shows a coordinate measuring equipment according to the invention, in a stand construction.

FIG. 1 shows a coordinate measuring equipment (1) according to the invention, with at least one part (4) in the form of a stand that is movably guided on guideways (9a, 9b) in order to measure a workpiece, and a drive (10) which is not further shown in FIG. 1 (see FIGS. 2 and 3), for moving the part (4), along the guideways (9a, 9b), that are embodied as metal rails.

The movably guided part (4) is guided by means of ball shoes, not shown in further detail, on the guideways (9a, 9b). Such ball shoes and the guideways associated with them, are known from the state of the art. We refer in this connection to the product "Kugel-Shienenführungen" (ball rail guides) of the Deutsche Star company, of the Mannesmann-Rexrodt group.

A Z-slide (3) is movably mounted on the part (4) such that it can be moved vertically on the part (4) in the direction of the arrow (5). In addition, the Z-slide also has a guideway for an extension arm (2), which can be moved horizontally along the Z-slide (3) in the direction of the arrow (6). A said sensor (41) is fastened to the end of the extension arm (2), and the workpiece to be measured can be measured with it. The sensor (41) is not shown in more detail in the drawing, and can be embodied as either a mechanical sensor or an optical sensor, as is usual in coordinate measuring equipments.

Figure 2:
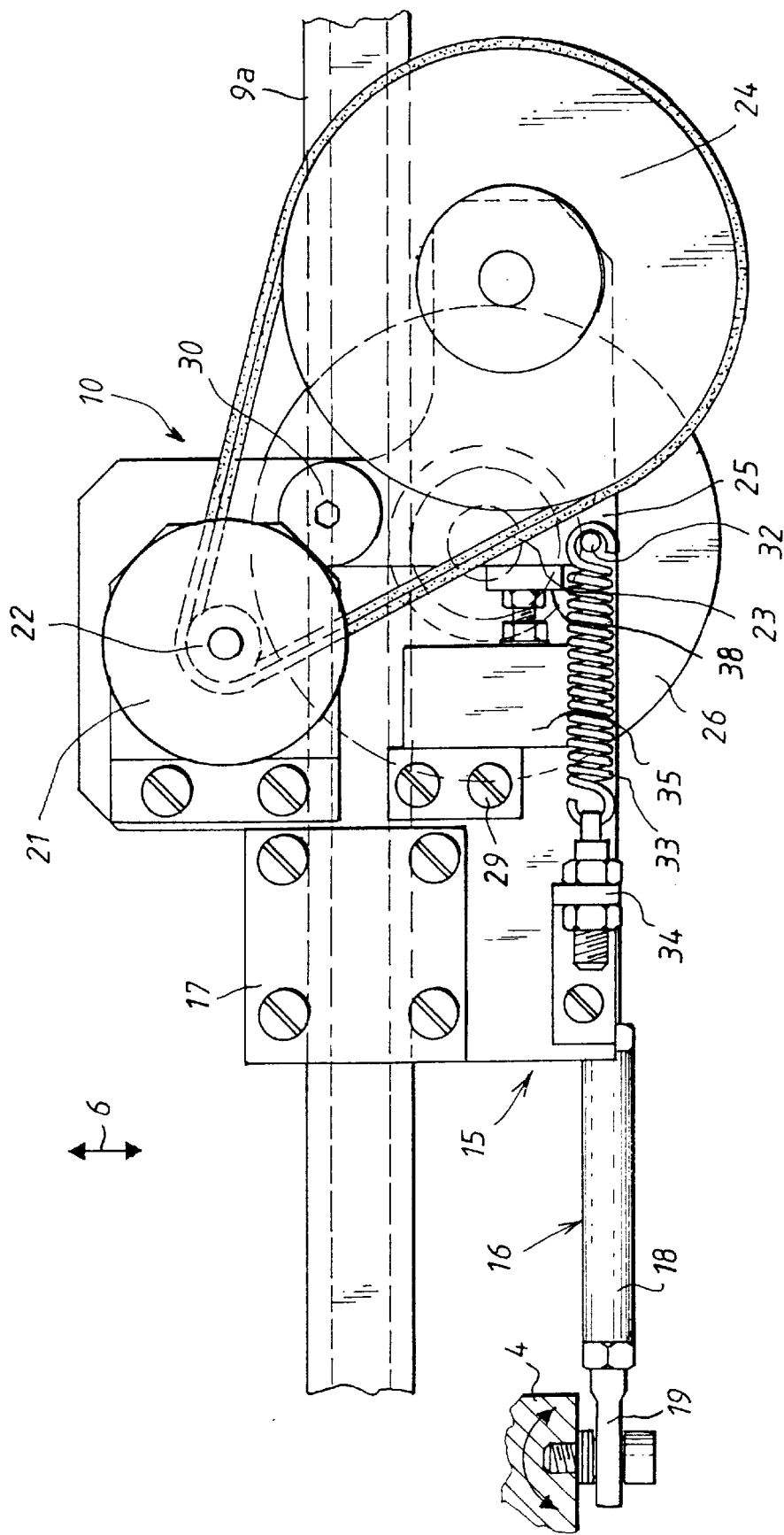
FIG. 2 shows a drive unit for a coordinate measuring equipment according to FIG. 1, in plan view.

FIGS. 2 and 3 show a plan view and a side view of the drive unit for the part (4) of the coordinate measuring equipment.

As is particularly apparent from FIG. 3, the drive (10) of the drive unit to move the part (4) has a frictional connection (13), which is connected to the guideway (9a). The frictional connection (13) includes a friction wheel (43), consisting of a wheel (11) with a rubber tire (12) on it, in contact with the guideway (9a). The rubber tire (12) of the friction wheel (43) makes contact in a groove (14a) on the guideway (9a).

The guideway (9a) itself is constructed as a metal guideway of steel, and laterally has two grooves (14a), of which only the groove of the one side is shown.

As can further be seen from FIG. 3, the drive (10) is located on a separate slide (15), which is movable transversely of the guideway (9a), and is connected to the movably guided part (4) by means of a connector (16). The whole slide (15) is movably mounted by means of a ball shoe (17) for movement on the guideway (9a) in the direction of the arrow (7), as has already been described hereinabove in connection with the part (4). As is likewise mentioned hereinabove, such ball shoes and the associated guideways are obtainable under the designation "ball rail guides" from, the Deutsche Star company, of the Mannesmann-Rexrodt group.

The connector (16) is embodied as follows, in order to connect the slide (15), to be movable transversely of the guideway, to the movably guided part (4). The connector (16) has for this purpose a rod (18) which is connected at its one end to the slide (15) by means of a joint (20), and is connected at its other end to the movable part (4) by means of a joint (19).

The joints (19, 20) are constructed as standard, obtainable ball joints, a kind of screw, on which one partial segment of a ball is formed, and is mounted in a correspondingly associated cage. The essential feature of this connection, which is movable transversely of the guide (9a) by the connector (16), is that the connector (16) has at least two joints (19, 20). The slide (15) can thereby be moved relative to the part (4) both in the direction of the arrow (5) and in the direction of the arrow (6) relative to the part (4), without moving the part (4) as well. In contrast, in the drive direction according to the arrow (7), the slide (15) is connected completely rigidly to the part (4), so that the drive force can be directly transmitted to the part (4).

The manner of operation of the drive (10) will now be described. The drive (10) includes as an important element, a motor (21) whose drive wheel (22) drives, via a V-belt (23), a wheel (24) which is rotatably mounted on a plate (25). The wheel (24) is further rigidly connected, through the plate (25), to a wheel (40), which drives via a frictional connection a second wheel (26) which for its part is directly connected, through the plate (28), to the friction wheel (43).

The frictional connection (13) or the friction wheel (43) is thus driven by the motor (21); the motor (21) is connected by means of a coupling (42) to the frictional connection (13) or to the friction wheel (43). The coupling (42) will be described as follows. The motor (21) is screwed fast to the plate (27) by means of a corresponding mounting (31) and a screw (29). The wheel (24), on the contrary, is rotatably mounted on a plate (25), and the plate is, for its part, rotatable with respect to the plate (27) around a rotational joint (30). In the normal state, the plate is then drawn against the plate (27) by means of the pin (32), the spring (33), and the holder (34) attached hereto, so that the wheel (40) is in contact with the wheel (26) and a frictional connection is thereby constantly present. In order to uncouple the motor (21) from the friction wheel (43), a pneumatic cylinder (36) is installed on the plate (27), and can move a piston (37) in the direction of the arrow (38), so that the plate (25) is pivoted about the rotational joint (30) and the wheel (40) is no longer in contact with the wheel (26). The part (4), and of course the slide, can be directly displaced by hand.

It goes without saying that the invention is not limited to the embodiment described here. It is of course to be included together with similar coordinate measuring eon equipment which are constructed according to the sense of the invention. For example, instead of the movable part (4) which is described here as a stand, other movably guided parts which are used in coordinate measuring equipment, as for example the portal of a portal measuring equipment, the extension arm (2), etc., can also be provided with a drive according to the invention.

What is claimed is:

1. A coordinate measuring equipment (1), comprising:
   at least one part (4) that is movably guided on a guideway (9a, 9b) for measurement of a workpiece, and
   a drive (10) for moving said part (4) along said guideway (9a, 9b),
       wherein said drive (10) is connected to said guideway (9a, 9b) by frictional connection (13) and said drive

(10) is located on a separate slide (15) that is movably mounted on said guideway (9a, 9b) and is connected to said part (4) by a connector (16), which permits movement of said slide (15) with respect to said part (4) in a direction transverse to said guideway.

2. The coordinate measuring equipment according to claim 1, wherein said connector (16) comprises at least two joints (19, 20).

3. The coordinate measuring equipment according to claim 2, wherein said connector comprises a rod (18) that is connected at one end to said slide (15) by means of one of said two joints and is connected at its other end to said movable part (4) by means of the other of said two joints (19).

4. The coordinate measuring equipment according to claim 1, wherein said drive comprises a motor (10) that is connected to said frictional connection (13) by means of a coupling (42), for driving said frictional connection (13).

5. The coordinate measuring equipment according to claim 1, wherein said frictional connection (13) includes a friction wheel (43) that is in contact with said guideway (9a, 9b).

6. The coordinate measuring equipment according to claim 1, wherein said guideway (9a, 9b) comprises a metal guideway.

* * * * *